Dec. 16, 1941.   A. K. ANDREWS   2,265,977
RECOVERY OF PRECIOUS METAL FROM DESERT SANDS AND FROM DESERT PLACER
Filed Jan. 21, 1939   2 Sheets-Sheet 2
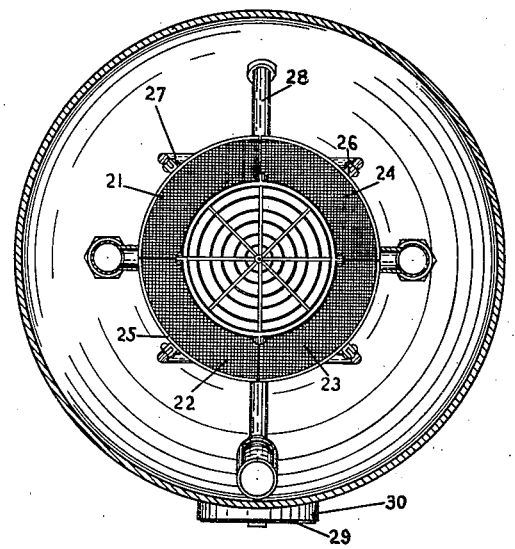
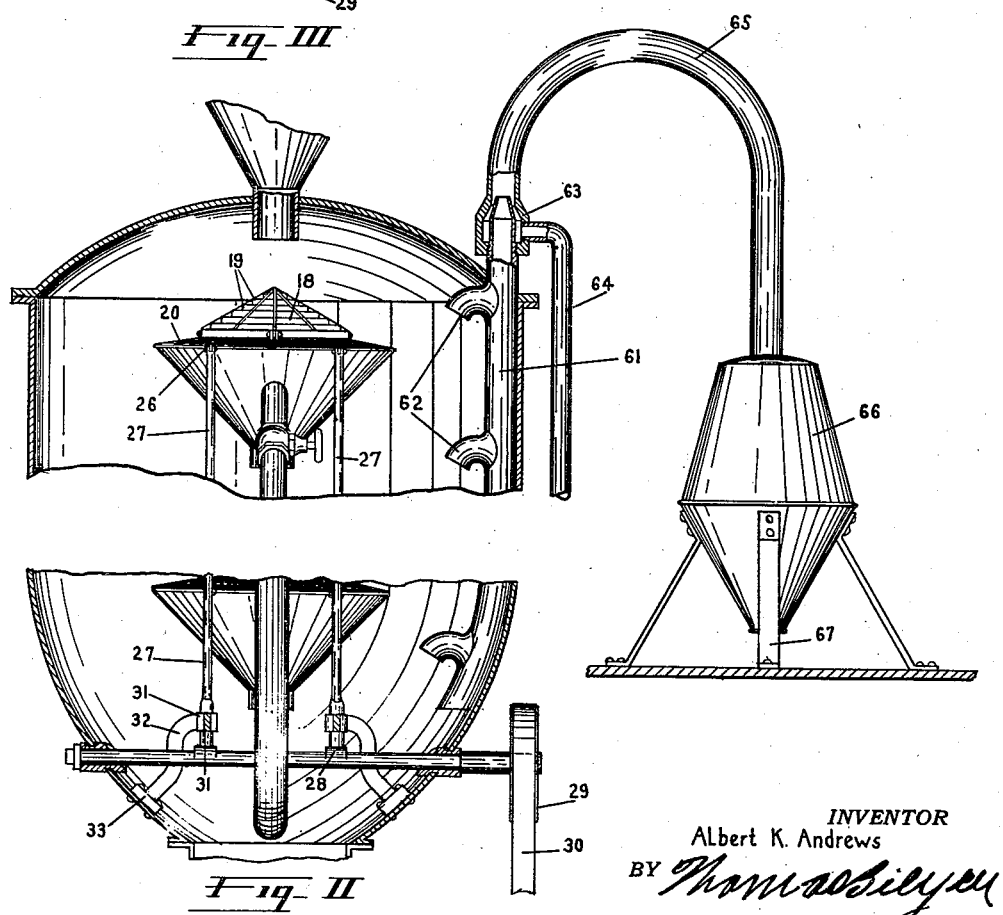
INVENTOR
Albert K. Andrews
BY
ATTORNEY னPatented Dec. 16, 1941

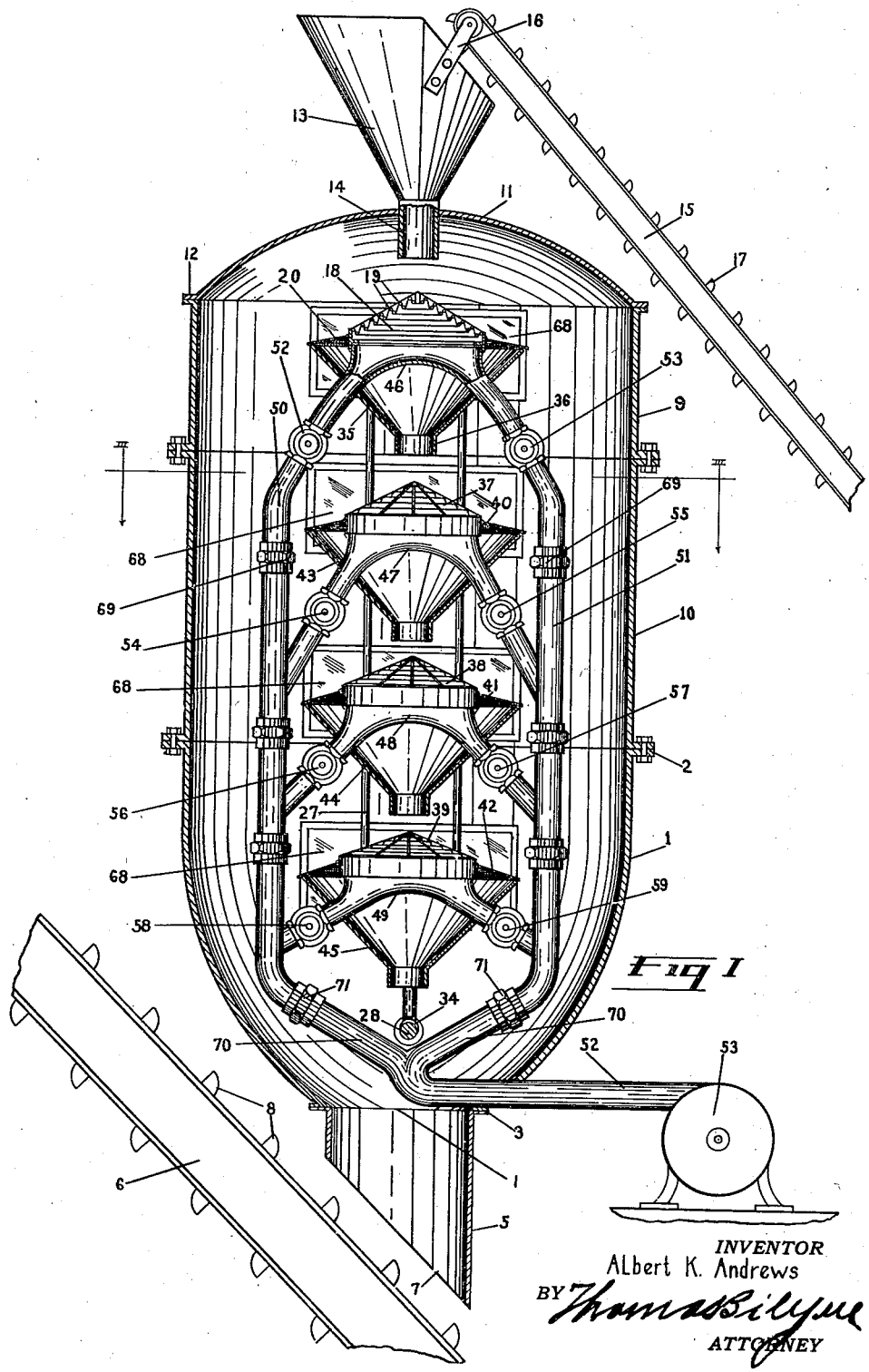

2,265,977

UNITED STATES PATENT OFFICE 2,265,977

RECOVERY OF PRECIOUS METAL FROM DESERT SANDS AND FROM DESERT PLACER

Albert K. Andrews, Vancouver, Wash.

Application January 21, 1939, Serial No. 252,142

10 Claims. (Cl. 209—44)

My invention relates to a machine for the recovery of precious metal from desert sands and from desert placer bearing material.

The primary purpose and object of my invention is to provide a machine that will effect the recovery of the precious metal from dry placer in which the recovery is effected without the use of water. The recovery being effected through the use of air separation caused by the circulating of air of relatively high velocity through the treating machines.

The invention is comprised primarily of a shell made up of a plurality of independent sections that may be secured together by flanges disposed upon the mid-sections of the shell. A feeding hopper is superposed the shell and power means is provided for delivering screened material into the hopper. The hopper is disposed at the top of the shell and the elevated material flows from the hopper through the action of gravity into the treating shell. A plurality of treating heads are disposed within the shell and in spaced relation with each other with a recovery head and a screen being disposed in the top end of each of the heads. Means is provided through the side wall of the shell for the removing of each of the heads independently. A hopper is immediately disposed below each of the heads and the screens permit a retreating of the material in the head disposed immediately therebelow.

Independent means is provided for admitting treating air into each of the treating heads and below the recovery head in order that the air will flow upward through each of the treating heads.

This device provides for a multiple treatment of the material as it flows through the sheet by the action from the feeding hopper to the base of the shell. Dross material is delivered through the base of the shell and is deposited upon an off-bearing conveyer. Power means is provided for eliminating the dust developing within the shell through the action of a suction creating exhauster. The dust finally being delivered into a dust collector.

The primary object of my invention is for the recovery of precious metals from desert sands and desert placer.

A further object is to provide a machine for the recovery of metal concentrate from desert placer without the use of water.

A further object of my invention is to provide a machine that is relatively cheap in production and one that will handle a volume of material and thus make available a machine for the treating of desert sands and placer material that will be relatively cheap in first cost. One that will have a large capacity and one that is particularly adapted for the recovery of microscopic and fine material of high specific gravity from desert sands and desert materials.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. I is a fragmentary partially sectional side view of an assembled device.

Fig. II is a fragmentary and partial angle sectional side view of the device taken at a ninety degree angle from the partial sectional side view illustrated in Fig. I.

Fig. III is a fragmentary sectional end view of the mechanism illustrated in Fig. I. This view is taken on line 3—3 of Fig. I looking in the direction indicated.

Like reference characters refer to like parts throughout the several views.

I provide a shell in which the treatment of the material is to primarily occur. This shell is composed of a base 1 that has flanges 2 and 3 disposed upon its oppositely disposed ends with the base end of the shell uniformly tapering downward to form a restricted opening 4 through which the residue of the untreated material will flow. A discharging chute 5 terminates the lower end or the base of the shell and an off-bearing conveyer 6 operates immediately below the discharge end of the spout. The discharge end of the spout is cut at an angle as illustrated at 7 to shape the end so that it will be disposed substantially parallel to the off-bearing conveyer.

An endless bucket line is run within the conveyer frame and a plurality of spaced buckets 8 outwardly extend therefrom and the buckets are positioned to receive materials discharged through the spout.

Intermediate shell members 9 and 10 are superposed the base 1 and each of the intermediate shell members have flanges disposed at their opposite ends to facilitate their being secured together and to the base end 1 and the head 11. The head of the shell 11 is preferably crowned and the flanges 12 are disposed upon their base end to adapt the same for being secured to and attached to the uppermost one of the intermediate shell members 9.

A loading hopper 13 is disposed central of the head 11 and a pipe 14 extends through the head 11 and discharges material into the shell.

A loading ladder 15 leads from the stock-pile and the upper end of the ladder is fixedly secured through the use of suitable brackets 16 to the feeding hopper 13. A loading bucket is provided for delivering material to be treated into the hopper 13. A plurality of treating heads here shown as four in number are disposed within the shell. Each of the treating heads have a common center line and this center line is also common to that of the pipe 14 in order that the material to be treated will flow in an orderly manner through the device. Each of the heads is composed of a cone-stepped head 18 made of wool felt or other suitable material to permit air under velocity to pass therethrough. The treating head 18 is mounted upon a suitable support and the head is made up of a plurality of steps 19 that form riffles for the recovery and maintaining of the heavy placer material that lodges thereupon. The head is removable and replaceable in order that cleanup may be made from the head.

A screen 20 that is inclined downwardly is disposed at the base of the treating head 18. The screen is preferably made of sections as illustrated at 21, 22, 23 and 24 in Fig. III. Each of the sections is hinged to permit a jig-like action being imparted thereto. Each of the screen sections has a rim 25 disposed about its outer periphery. A pair of lugs 26 are secured to the rim and a jig bar 27 is hingedly secured to the lugs 26. The jig bars 27 are vertically disposed within the shell and a power driven cam-shaft 28 is disposed transversely of the base end of the shell with a pulley 29 being mounted upon the shaft that is adapted for being driven with a belt 30 trained therearound. A belt 30 is power actuated from a source of power not here shown. The shaft 27 moves within a suitable guide 31. With the guide being supported by an arm 32 that is secured and its base end 33 that is secured to the shell 1. A cam 34 is mounted upon the shaft 28 and the same engages the bottom end of the rod and imparts an up and down movement thereto as the shaft is rotated upon which the cam 34 is mounted.

The larger material is screened out between the hoppers and the screened out material is eliminated therefrom through the base 1 and is deposited upon the off-bearing conveyer 6. The material passing through the screen 20 flows into the hopper 35 and a discharge pipe 36 forms the discharge end of the hopper 35 and deposits that fine material upon the head 37 that is disposed therebelow. The heads 37, 38, and 39 are made similar to, in general construction, to that of the head 18. The details of construction may vary somewhat due to the fact that progressively finer material is to be treated within the succeeding heads disposed therebelow.

Screens 40, 41, and 42 are similar to the screen 20 and these screens are associated with each of the respective heads 37, 38, and 39 and each of the heads and each of the screens are independently removable.

Hoppers 43, 44, and 45 are also associated with the respective heads 37, 38, and 39.

Air chests 46, 47, and 48, and 49 are associated with each of the hoppers 35, 43, 44, and 45 and treating air is admitted into each of the chests 46, 47, 48, and 49 through air delivery tubes 50 and 51 that are associated with each side of the assembly. Air is supplied to the respective tubes 50 and 51 through a feeder pipe 52 into which air is pumped from any suitable pressure blower 53. Each of the tube chests 50 and 51 are in communication with the respective chests 46, 47, 48, and 49 by suitable piping connections. In order that the volume and velocity of air being admitted into the respective chests may be settable and determinable, I provide suitable valves in each of the pipes as illustrated at 52, 53, 54, 55, 56, 57, 58, and 59. These valves permit a fine adjustment in the flow of the air from the respective pipes 50 and 51 into the respective chests 46, 47, 48, and 49 so that the pressure and velocity, or volume of air that is to flow through the treating heads 37, 38, and 39 may be manually controlled.

All of the material passing through the respective screens is retreated in the head disposed immediately therebelow and the degree of fineness of material to be recovered is somewhat determinable with the help of the treating head material and the velocity of the air flowing therethrough. All material not passing through the respective screens gravitates into the base of the shell and is removed therefrom through the use of the bucket line.

In order that the dust collecting within the shell may be continuously removed therefrom and be prevented from entering the open atmosphere, I provide one or more suction chests 61 with a plurality of suction tubes 62 communicating the chest with the interior of the shell.

A syphon head 63 is disposed at one end of the chest 61 and a fluid under pressure is supplied to the syphon head with a pipe 64 that leads to a source of supply of the fluid, as air or steam. The dust sucked from the shell flows through a suitable tube 65 to a dust collector 66. The dust collector 66 is supported upon a suitable support 67.

The size and character of the shell structure will be determined by the character of the material that is to be treated. If the recovery by air flotation is easily made, the head 11 may be directly secured to the base 1, and but a single recovery head with its associated parts may be used. If additional recovery problems are encountered, one or more of the intermediate members 9 and 10 is used. In order that the heads 18, 37, 38, and 39 may each be removed from the shell, I provide a door 68 within the respective shell members with the door 68 being positioned substantially opposite to that of the head to be removed, in order that the head assembly may be taken directly through the respective door members.

It will also be noted that the delivery tubes 51 have a plurality of joints 69 disposed therein, in order that the delivery tube may be fitted to the respective lengths of the shell that is to be used. It will also be noted that the delivery tubes 51 are, here shown, to be connected upon their lower ends to the Y 70 disposed upon the inner end of the feeder pipe 52 and suitable joints 71 connect the respective ends of the Y with the delivery tubes 51. The velocity and volume of the air to be supplied to the respective chests 46, 47, 48, and 49 is determined by the character of the material to be treated, the specific gravity of the same and the fineness of the material is also somewhat determined by the fineness of the specific gravity of the precious metal that is to be recovered.

While the form of mechanism herein shown and described is admirably adapted to fulfill the objects primarily stated, it is to be understood that it is not intended to confine the invention to the embodiment herein shown and described, as it is susceptible of embodiment in various forms, all coming within the scope of the claims which follow.

What I claim is:

1. In a device of the class described, the combination of a shell, a treating head disposed within the shell, said treating head having a porous body made of a felt material, and said treating head being arranged in stepped conical formation and a screen disposed at a lower elevation than that of the treating head outwardly extending therefrom and a hopper disposed immediately therebelow, means for imparting a jigging motion to the head and screen and means for supplying a controlled volume and velocity of air into the hopper and means for exhausting the shell.

2. In a device of the class described, the combination of a shell base, a plurality of shell sections removably securable to each other and to the base, a top for said shell, a material hopper disposed central of the shell and superposed the top, means for conveying materials into the superposed hopper, a plurality of treating heads disposed within the shell, said treating heads being disposed one above the other and in axial alignment with each other and each disposed axially of the shell, each of said treating heads having a central wool fabric top that is formed of concentric riffles and a metal screen disposed peripherally of the fabric top, and disposed at a lower elevation than the wool fabric, the top of the fabric end of the screen being downwardly sloping, a hopper disposed immediately below each of the heads, an air chest disposed immediately below each of the fabric tops of each of the heads, means for supplying air in controlled volume to each of the riffled fabric tops, means for imparting a jigging action to each of the fabric heads and screens disposed adjacent therearound, means for exhausting the shell of dust laden air and means for off-bearing dross material from the base of the shell.

3. In a device of the class described, the combination of a structural shell, said shell having a convex top and a concave bottom, means for delivering material to be treated through the top and for eliminating dross material through the bottom of the shell, means for creating a negative atmospheric pressure within the shell, a plurality of treating heads disposed in vertical spaced relation with each other, each of said treating heads formed of a central part made of a riffled wool fabric, a metal screen ring disposed about the central part and outwardly and downwardly extending from the central part, means for forcing air in predetermined velocity and intensity to blow articles above a predetermined specific gravity from the central part, and means for imparting an up and down motion to the central part of each head.

4. In a device of the class described, in combination, a shell, means for delivering materials through the top of the shell, a plurality of spaced treating heads disposed axially of the shell and in spaced vertical relation, screening means disposed at the side of and surrounding each of the treating heads for screening materials being deposited thereupon and flowing thereupon, the central part of each of the heads being riffled and made of a wool fabric material to permit air under pressure and velocity passing therethrough in sufficient intensity to prevent articles of low specific gravity coming in contact with the central part of the treating head, means for imparting an up and down motion to that part of the treating head through which the air freely passes, and means for creating a negative atmospheric pressure within the shell.

5. In a device of the class described, in combination, a cylindrical shell with the longitudinal axis of the shell being disposed vertically, a plurality of treating heads that are coaxial with the shell and with each other disposed in vertical spaced relation within the shell, means for removing each of the treating heads through the side of the shell, means for passing air under pressure and in volume independently through the central part of each of the treating heads, with the central part of each treating head being riffled, means for removing dust particles from the air before such passage through the treating heads, means for exhausting dust laden air from the shell, means for collecting the dust from the air so exhausted, and means for screening the mass to be treated as it passes from one treating head before its entry upon the treating head disposed therebelow.

6. In a device of the class described, in combination, a shell, treating heads formed of concentric rings of felt riffles arranged in stepped formation disposed within the shell, in spaced relation with each other and one above the other, means for imparting an up and a down motion to the riffled parts of each of the treating heads, with the central part of each of the treating heads being sufficiently porous to permit the free passage of air under pressure and velocity therethrough and of sufficient density to support material of a high specific gravity deposited thereupon and means for feeding materials continuously into the shell and for off-bearing dross materials through the base of the shell and means for clarifying the air being passed upward through the felt covered heads.

7. In a device of the class described in combination, a fabricated shell means for feeding material into the one end of the shell and for off-bearing dross material from the other end of the shell, a plurality of treating heads disposed within the shell, and positioned to receive deposited fed material entering the shell and for flowing downward therethrough, said treating heads being covered with felt material that is formed of a plurality of rings in stepped formation and means for imparting a jigging action to the heads, means for supplying a predetermined volume and velocity of clarified air below each of the treating heads, and means for forcing the air through riffled felts, means for exhausting the shell, and for removing the top from the shell.

8. In combination in a treating head for the recovery of the precious metal concentrates from desert placer, comprising a recovery head the top surface of which is made of wool felt, said top surface of the felt being arranged in a series of concentric riffles, means for jigging the wool felt recovery head, a classifying screen disposed below and surrounding the riffled wool felt, and so arranged that material that is not retained on the wool felt will be required to flow over the screen, means for causing an air blast to flow through the riffled felt, means for continuously feeding materials to the top surface of the head, a chamber for said head and means for exhausting said chamber.

9. In combination in a device for treating desert placer, comprising a shell, a plurality of spaced treating heads disposed within the shell with the treating heads having a top surface that is circular, that is formed of wool felt arranged in riffles and having a screen disposed around the head and positioned to receive dross material flowing from the head and classifying screens disposed around the treating head, means for blowing air upward through said heads, means for removing the dust from said air before the same is blown through the wall of the shell and means for feeding materials to be treated into the shell and above each of the treating heads and means for eliminating dross material from the base of the shell.

10. In combination in a device of the class described, comprising a shell, a plurality of treating heads disposed within the shell, and said heads being spaced apart and above the other, said treating heads being made up of a frame and a riffled filter of such porosity as to permit an air blast being blown upward therethrough yet of sufficient density to collect and support materials of high specific gravity thereupon that are deposited thereupon, means for jigging the riffled filter, means for eliminating dust from the air that is to be blown through the filter before entering the filter, means for feeding materials into the air blast above the filter, said screen being positioned to permit dross material from the filter passing thereover.

ALBERT K. ANDREWS.